UNITED STATES PATENT OFFICE.

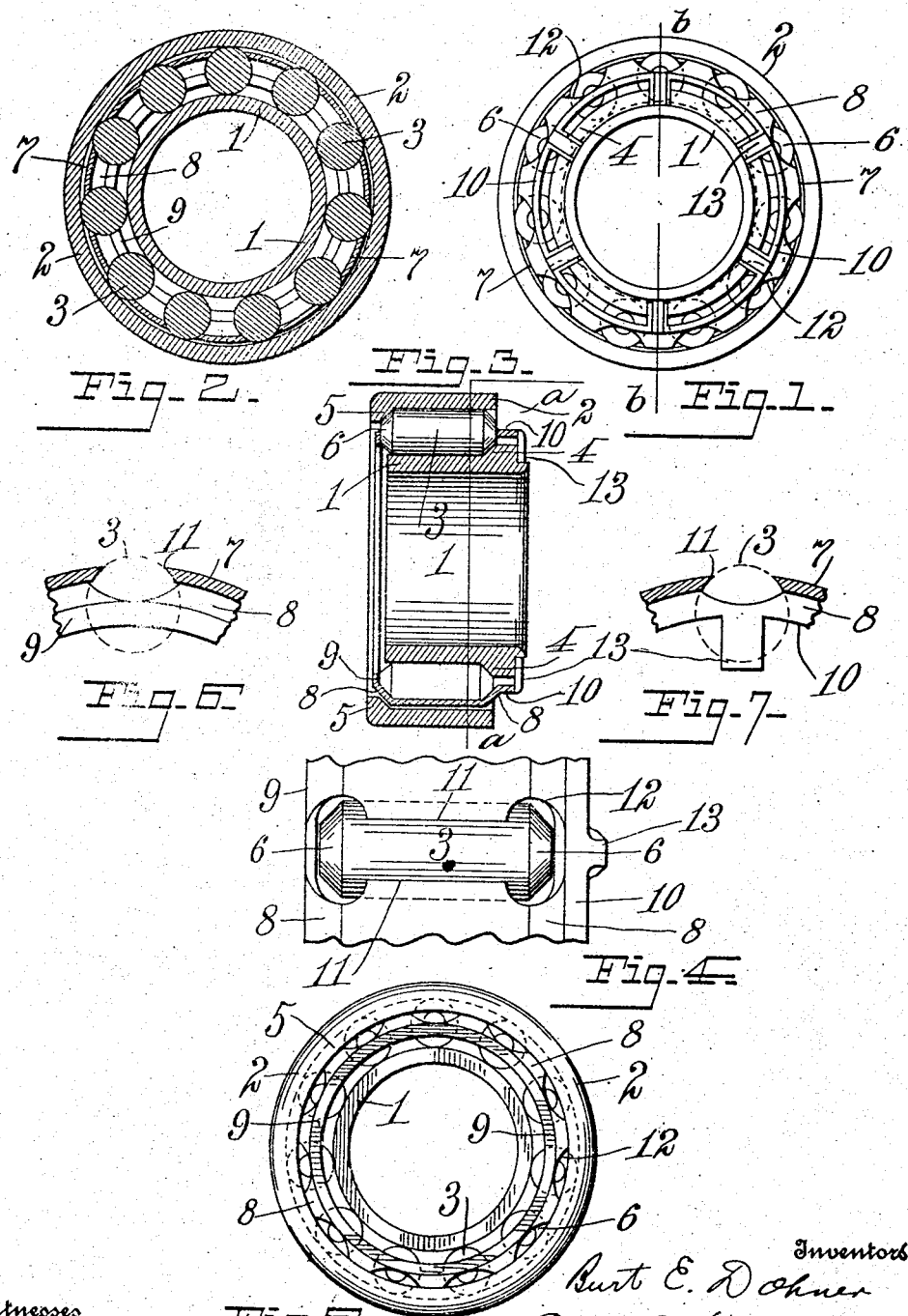

BURT E. DOHNER AND ALBERT J. HUFF, OF DAYTON, OHIO.

ROLLER-BEARING.

1,108,722.

Specification of Letters Patent. Patented Aug. 25, 1914.

Application filed February 17, 1913. Serial No. 748,828.

*To all whom it may concern:*

Be it known that we, BURT E. DOHNER and ALBERT J. HUFF, citizens of the United States, residing at Dayton, in the county of Montgomery and State of Ohio, have invented certain new and useful Improvements in Roller-Bearings; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in roller bearings and more particularly to the cage thereof.

The object of the invention is to provide a roller bearing cage which is of durable and simple construction and which permits the conical ends of the rollers to engage the cones of the bearings without interfering with the action of the rollers. Owing to the construction, the rollers and inner bearing member are handled as a unit.

Referring to the accompanying drawings, Figure 1 is a side elevation of our improved roller bearing; Fig. 2 is a section on the line $a$—$a$ of Fig. 3; Fig. 3 is a section on the line $b$—$b$ of Fig. 1; Fig. 4 is a plan view of one of the retaining pockets for the rollers; Fig. 5 is an elevation of the bearing opposite that shown in Fig. 1; and Figs. 6 and 7 are enlarged detailed views of the retaining pockets.

Referring more particularly to the drawings, 1 represents the inner and 2 the outer bearing rings. Mounted between said rings 1 and 2 are cylindrical rollers 3 whose diameters are equal throughout their length except at their extreme ends which are tapered. The inner ring 1 is adapted to receive a shaft and ring 2 is adapted to be mounted in a journal box, which parts are not shown. To take up the end thrust of the shaft and to prevent the same moving longitudinally in one direction, the rings 1 and 2 are provided with oppositely arranged cone-shaped annular shoulders 4 and 5 which are adapted to be engaged by conical ends 6 of the rollers. The said rollers act as struts when overcoming the thrust between the two conical shoulders 4 and 5. Each bearing, consisting of the rings 1 and 2 and the rollers 3, is adapted to overcome the end thrust of the shaft in one direction, while a duplicate bearing, placed in a reversed position, is adapted to overcome the end thrust of the shaft in the opposite direction.

To enable the ring 1 and rollers 3 being handled as a unit, when the bearing is being assembled, for example, the following retainer means is provided: 7 represents a cylindrical shell provided with inclined side portions 8 and side flanges 9 and 10. The said shell 7 is mounted between the rings 1 and 2 adjacent to ring 2. The rollers 3 are mounted between said shell 7 and the ring 1 and said shell is provided with openings 11 through which the rollers 3 project and which permits said rollers to engage the ring 2. The edges of the openings 11 are preferably chamfered, and the width of the openings is less than the diameter of the rollers, so that said rollers are prevented from falling through said openings and out of the shell. To permit the conical ends 6 of the rollers 3 to engage the conical shoulders 4 and 5, the shell 7 and the inclined portions 8 thereof are provided with enlarged openings 12 which lie at the ends of the openings 11. The outer surfaces of the inclined portions 8 lie below the surfaces of the conical ends 6 of the rollers and the width of the end openings 12 is greater than the diameter of the rollers so as to enable the conical ends 6 of said rollers to project out of the shell and to engage the conical shoulders 4 and 5. The edges of the openings 11 prevent the rollers 3 moving laterally to the shell 7, while the flanges 9 and 10 prevent the rollers moving longitudinally. The shell 7 is provided with ears 13 adapted to engage the shoulder 4, and prevent the shell moving longitudinally relative to the ring 1 in one direction while the shoulder 4 prevents the rollers and shell moving in the opposite direction. The shell 7 therefore maintains the rollers 3 in their proper position on the ring 1 and permits the rollers 3 and ring 1 to be handled as a unit.

Having described our invention, we claim—

In a bearing of the type specified, the combination with an inner and an outer bearing ring provided with conical shoulders arranged at opposite ends of said rings, and rollers having conical ends mounted between said rings, of a cylindrical cage mounted between said bearing rings and provided with radial openings the under edges of which are chamfered to permit the rollers to extend through said radial openings, conical flanges attached to said cylindrical cage the conical flanges and the cage being provided with openings which form enlarged ends of said radial openings and through which the conical ends of the rollers project, and ears extending from one of said conical flanges and engaging the inner bearing ring, whereby said inner bearing ring, said rollers and said cage may be handled as a unit, substantially as specified.

In testimony whereof we affix our signatures, in presence of two witnesses.

BURT E. DOHNER.
ALBERT J. HUFF.

Witnesses:
R. J. McCarty,
Matthew Siebler.